(12) United States Patent
Riehm et al.

(10) Patent No.: US 9,283,899 B2
(45) Date of Patent: Mar. 15, 2016

(54) LOCK FOR TORQUE NOSE

(71) Applicant: Thule Sweden AB, Hillerstorp (SE)

(72) Inventors: George Riehm, New Fairfield, CT (US); Gregor G. Weaver, Waterbury, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 14/285,140

(22) Filed: May 22, 2014

(65) Prior Publication Data

US 2015/0027175 A1  Jan. 29, 2015

Related U.S. Application Data

(60) Provisional application No. 61/859,080, filed on Jul. 26, 2013.

(51) Int. Cl.
| | |
|---|---|
| *B60R 9/048* | (2006.01) |
| *B60R 9/10* | (2006.01) |
| *F16B 37/14* | (2006.01) |
| *F16B 41/00* | (2006.01) |

(52) U.S. Cl.
CPC . *B60R 9/048* (2013.01); *B60R 9/10* (2013.01); *F16B 37/14* (2013.01); *F16B 41/005* (2013.01); *Y10S 224/924* (2013.01); *Y10T 70/5027* (2015.04)

(58) Field of Classification Search
CPC ............ B60R 9/10; B60R 9/048; B62H 3/04; B62H 3/10; B62H 5/005; B62H 5/06; E05B 71/00; Y10S 224/924
USPC ...................... 224/315, 323–324, 924; 70/62, 70/229–230, 233–235
See application file for complete search history.

(56) References Cited

U.S. PATENT DOCUMENTS

| | | | |
|---|---|---|---|
| 4,456,271 A | | 6/1984 | Kern et al. |
| 4,708,004 A | * | 11/1987 | Allen ............................. 70/226 |
| 4,756,175 A | * | 7/1988 | Matsushima et al. ........... 70/229 |
| 5,598,959 A | | 2/1997 | Lorensen et al. |
| 5,951,231 A | | 9/1999 | Allen |
| 6,152,541 A | * | 11/2000 | Huber ........................ 301/124.2 |
| 6,431,423 B1 | | 8/2002 | Allen et al. |
| 7,111,764 B2 | | 9/2006 | Smith et al. |
| 7,454,997 B2 | | 11/2008 | Putney et al. |
| 8,006,526 B2 | | 8/2011 | Fort et al. |
| 2005/0212302 A1 | | 9/2005 | Fisher |
| 2005/0268739 A1 | | 12/2005 | Sato et al. |
| 2010/0226748 A1 | | 9/2010 | Wolner et al. |
| 2011/0139842 A1 | * | 6/2011 | Sautter et al. ................. 224/324 |
| 2012/0298707 A1 | | 11/2012 | Sautter et al. |
| 2013/0020361 A1 | | 1/2013 | Sautter et al. |
| 2013/0062379 A1 | | 3/2013 | Sautter et al. |

\* cited by examiner

*Primary Examiner* — Justin Larson
*Assistant Examiner* — Scott McNurlen
(74) *Attorney, Agent, or Firm* — Sterne, Kessler, Goldstein & Fox P.L.L.C.

(57) ABSTRACT

A lock arrangement for a drive shaft of a tightening mechanism in a sports carrier. The lock arrangement includes a lock-wheel coupled to the drive shaft for rotation therewith, the lock-wheel having a peripheral zone with a detent and an abutment area adjacent thereto. The lock arrangement further includes a blocking tab that is movable toward the peripheral zone of the lock-wheel and insertable into the detent. The blocking tab being in abutting engagement with the abutment area in a lock-actuated configuration of the lock arrangement, the blocking tab being received in the detent in a locked configuration of the lock arrangement and the blocking tab being withdrawn from the detent in an unlocked configuration of the lock arrangement.

14 Claims, 12 Drawing Sheets

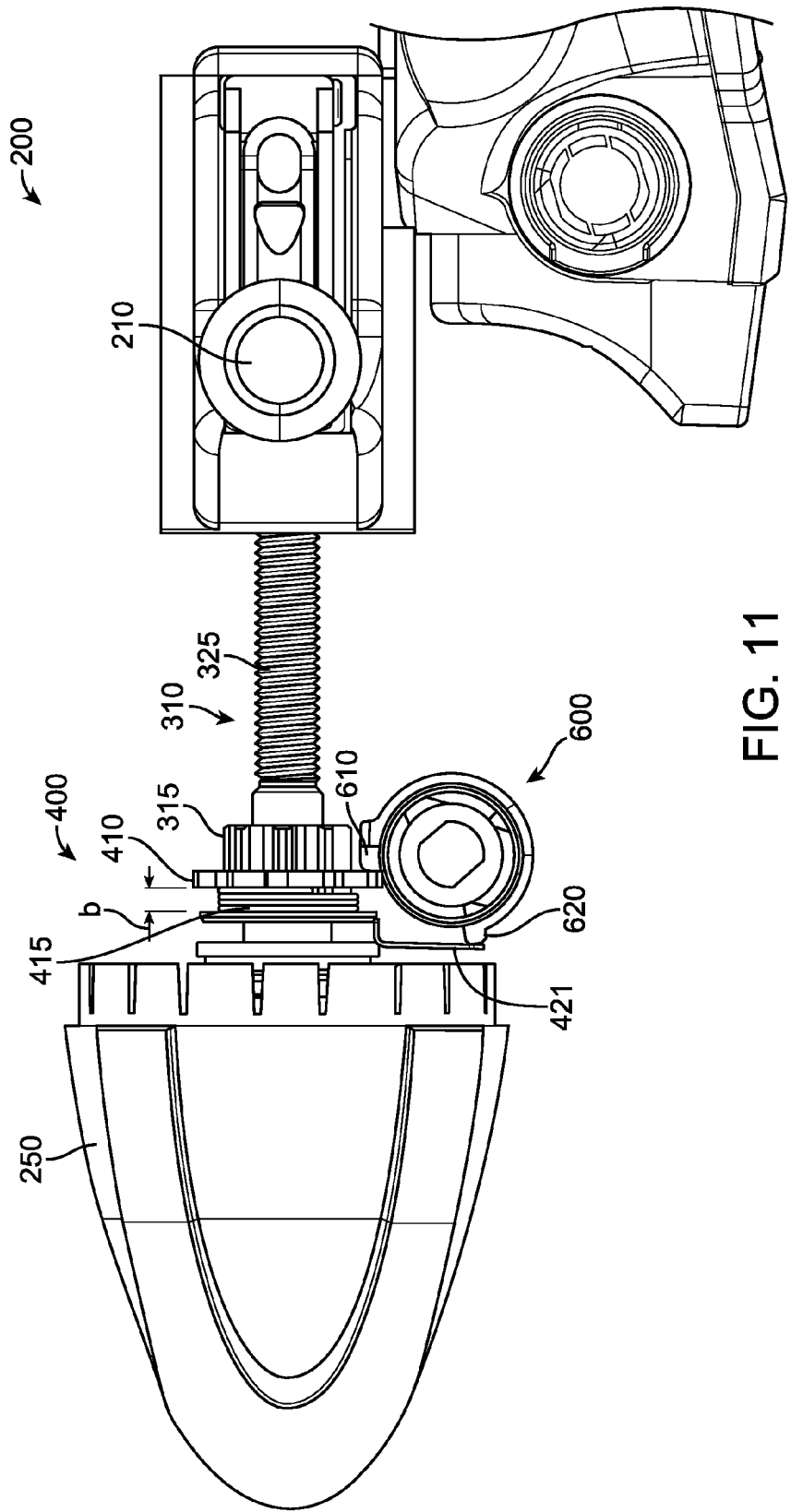

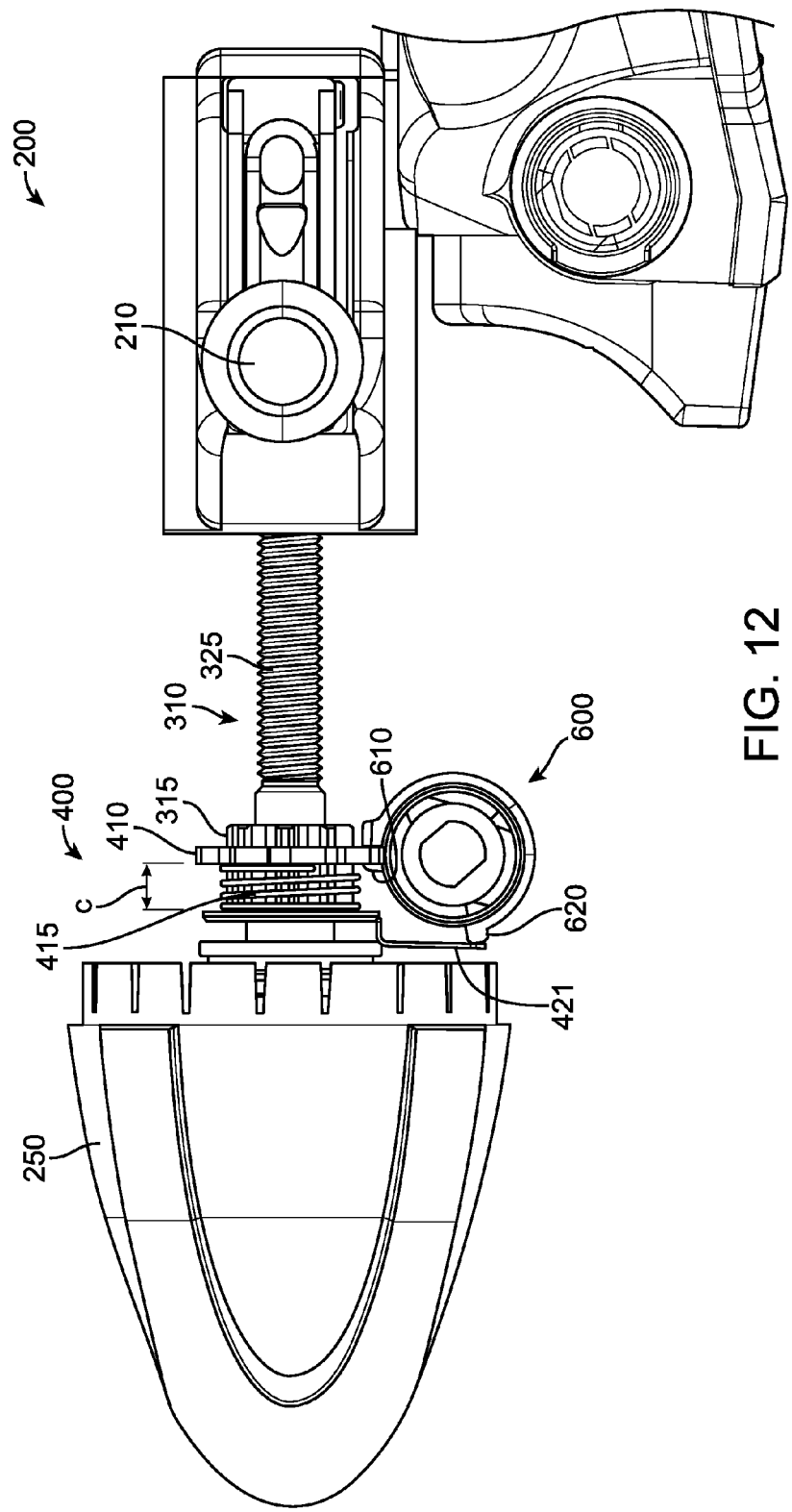

LOCK FOR TORQUE NOSE

CROSS-REFERENCE TO RELATED APPLICATION

This application claims priority to U.S. Provisional Application No. 61/859,080, filed on Jul. 26, 2013, the contents of which are entirely incorporated by reference herein.

FIELD OF THE TECHNOLOGY

The present application relates generally to locks for sports carriers. More specifically, embodiments of the present disclosure relate to a lock arrangement for a torque reactive tightening mechanism. In even more specific embodiments, the disclosure relates to a lock arrangement for a torque reactive tightening mechanism employed in fork mount bicycle carriers.

BACKGROUND OF THE TECHNOLOGY

Safety, security and convenience regarding sports equipment are high priorities for sports enthusiasts. One of the types of popular sporting equipment includes load carriers, including fork mounted bicycle load carriers. Securement of a bicycle on such a load carrier generally involves the removal of the front wheel of a bicycle, thus leaving the front fork of the bicycle unoccupied. The front fork is then fixed to a skewer on a fork mount of a rack. The skewer can generally be tightened to varying degrees, and in some cases a locking mechanism can be provided to reduce the chance of theft.

BRIEF DESCRIPTION OF THE DRAWINGS

Implementations of the present application will now be described, by way of example only, with reference to the attached figures, wherein:

FIG. 11 illustrates a side view of one embodiment of a locking arrangement for a fork mount in a lock-actuated configuration; and FIG. 12 illustrates a side view of one embodiment of a locking arrangement for a fork mount in a locked configuration.

DETAILED DESCRIPTION

Figure 1:
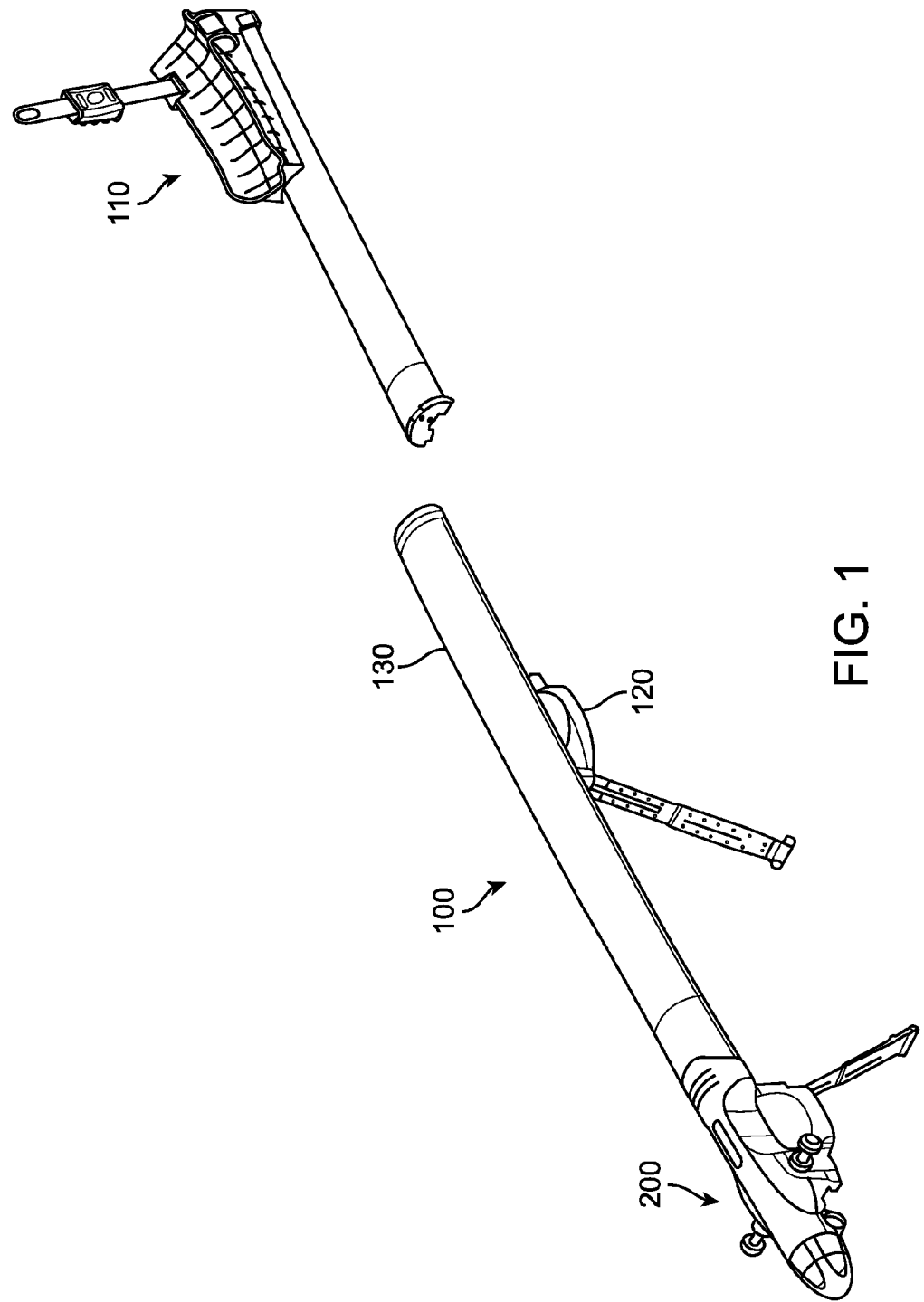
FIG. 1 illustrates a perspective view of one embodiment of a roof mounted bicycle carrier with a fork mount.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, the implementations described herein can be practiced without these specific details. In other instances, methods, procedures and components have not been described in detail so as not to obscure the related relevant function being described. Also, the description is not to be considered as limiting the scope of the implementations described herein. It will be understood that descriptions and characterizations of embodiments set forth in this disclosure are not to be considered as mutually exclusive, unless otherwise noted.

The present disclosure relates to a lock arrangement for a drive shaft of a torque reactive tightening mechanism in a sports carrier. The lock arrangement can include a lock-wheel coupled to the drive shaft for rotation therewith, the lock-wheel having a peripheral zone with a detent and a abutment area adjacent thereto. The lock arrangement can further include a blocking tab movable toward the peripheral zone of the lock-wheel and insertable into the detent. Further, the blocking tab can be in abutting engagement with the abutment area in a lock-actuated configuration of the lock arrangement, the blocking tab being received in the detent in a locked configuration of the lock arrangement and the blocking tab being withdrawn from the detent in an unlocked configuration of the lock arrangement.

In at least one embodiment, the peripheral zone of the lock-wheel is circumferential and has a plurality of detents and at least one abutment area. Moreover, a plurality of detents and abutment areas can alternate. Additionally, each of the detents can be a radial slot recessed into the lock-wheel and open at or near the circumference of the lock-wheel. The inner periphery of the lock-wheel can be spline-interconnected to the drive shaft for rotation therewith.

In at least one embodiment, the blocking tab can be biased toward the abutment area in the lock-actuated configuration of the lock arrangement. In some embodiments, the abutment area is biased toward the blocking tab in the lock-actuated configuration of the lock arrangement. In further embodiments, the blocking tab inserts into the detent when the lock-wheel is rotated while the blocking tab is in the lock-actuated configuration of the lock arrangement, thereby transitioning the lock arrangement from the lock-actuated configuration to the locked configuration. A biasing spring can be in abutting engagement with the lock-wheel that biases the abutment area toward the blocking tab in the lock-actuated configuration of the lock arrangement.

In at least one embodiment, there can also be tactile indicia which can signal that the lock arrangement has transitioned into one of the lock-actuated and locked configurations. Also, the lock arrangement can include the blocking tab extending off of a drive axle at a periphery thereof and an interference tab extending off of the drive axle at a different peripheral location. Furthermore, the interference tab can abuttingly engage a spring-biased member as the blocking tab approaches one of the lock-actuated and locked configurations. The interference tab can abruptly move into a tactile-detectable locked position when the blocking tab assumes one of the lock-actuated and locked configurations.

In at least one embodiment, the lock arrangement can also include audible indicia which can signal that the lock arrangement has transitioned into one of the lock-actuated and locked configurations. Moreover, the lock arrangement the blocking tab extending off of a drive axle at a periphery thereof and an interference tab extending off of the drive axle at a different peripheral location.

FIG. 1 illustrates a perspective view of one embodiment of a roof mounted bicycle carrier 100 with a fork mount 200. The bicycle carrier 100 a rear bicycle tire cradle 110 on the rear end with an exemplary fork mount 200 supported by rail 130. Brackets 120 are shown on the underside of the bicycle carrier 100 for mounting on the load bars of a vehicle (not shown). For example, the bicycle carrier 100 can be mounted to cross bars of a vehicle with the tire cradle 110 directed toward the rear of the vehicle and the fork mount 200 pointing forward, with the fork mount 200 end being considered the front. However, in other embodiments, the roof mounted bicycle carrier can be mounted to the roof of a vehicle in other ways, and can face rearward or to the lateral sides of the vehicle, or can be hitch mounted.

While in the present disclosure the fork mount 200 is disclosed in relation to the bicycle carrier 100, in other embodiments, the fork mount 200 can be connected to other types of bicycle carriers, or sports equipment carriers, as well as other types of load carriers.

Figure 2:
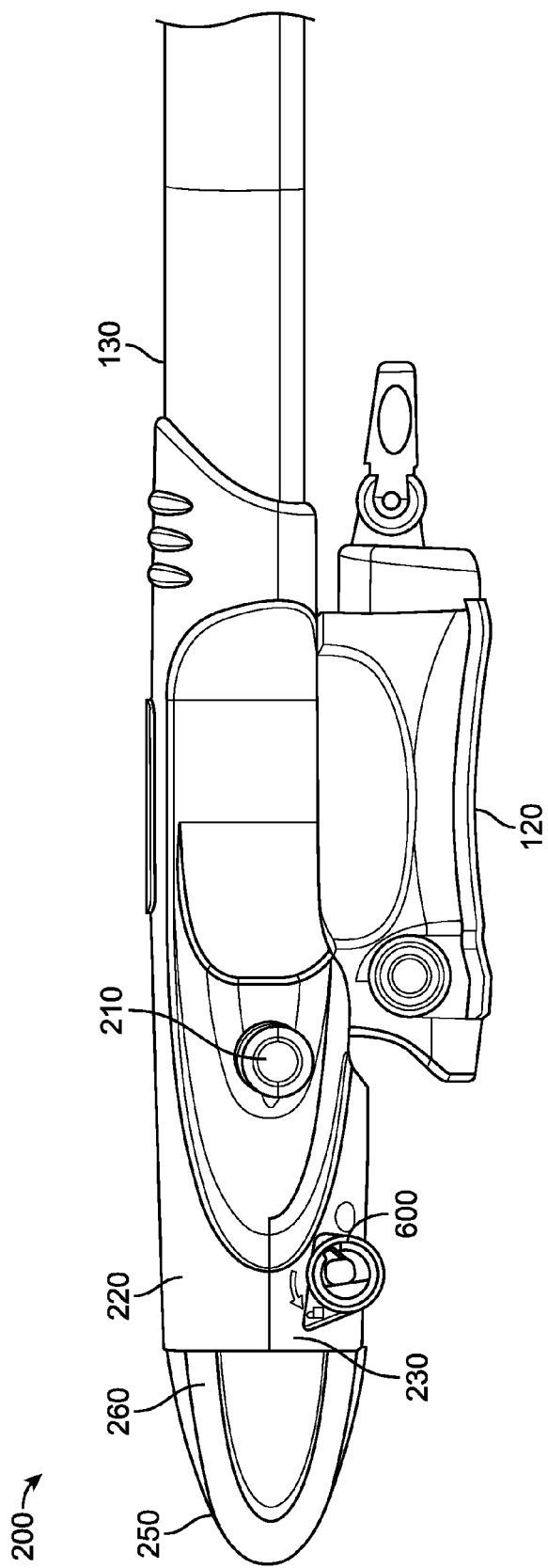
FIG. 2 illustrates a side view of one embodiment of the fork mount.

FIG. 2 illustrates a side view of one embodiment of the fork mount 200. Shown therein are skewers 210 for receiving the front forks of a bicycle (not shown). Also, the fork mount 200 has an upper housing 220 and a lower housing 230. The lower housing includes the locking drive axle 600. Moreover, a rotatable handle 250 is present the front end with ribs 260 to enable an operator to more easily grasp and rotate the handle 250 than would otherwise be the case.

Figure 3:
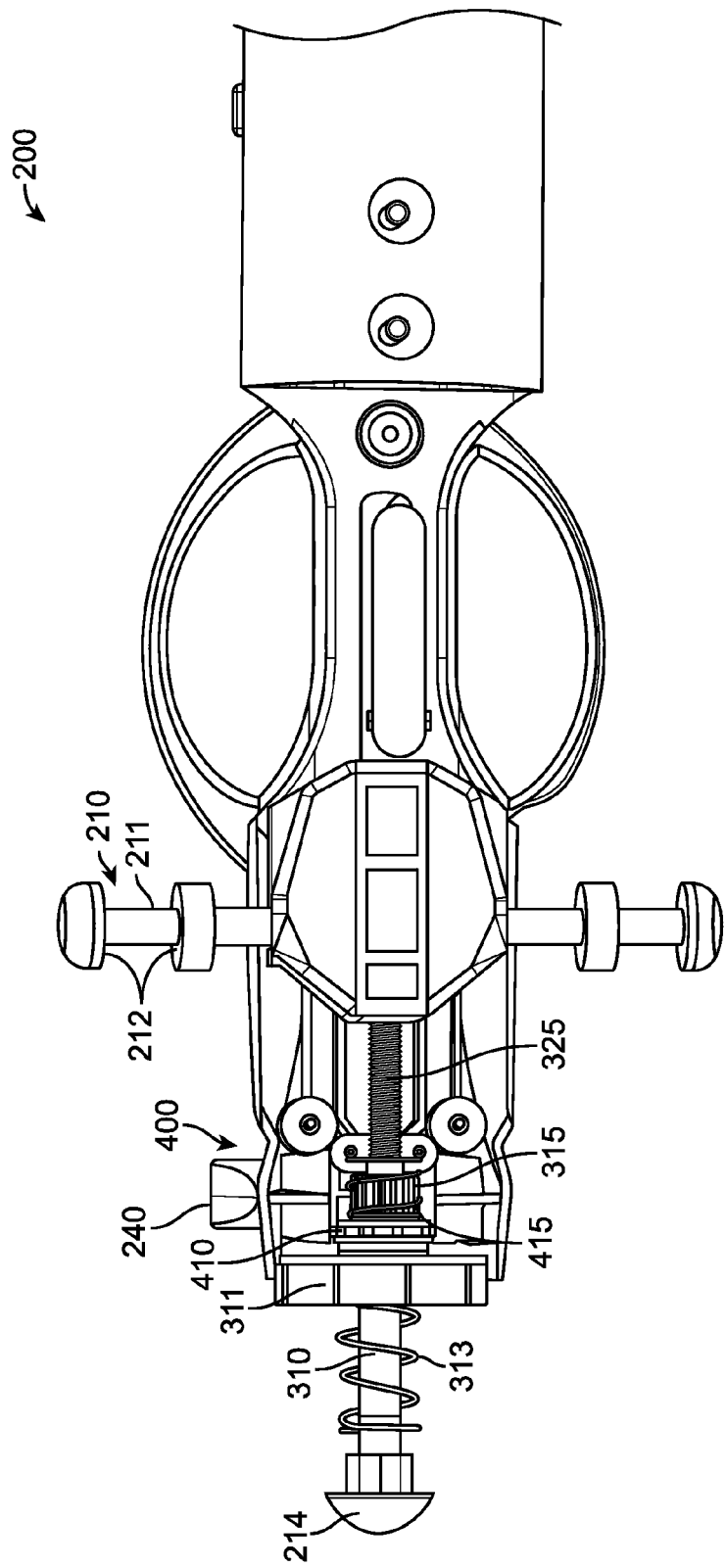
FIG. 3 illustrates an overhead view of one embodiment of the internal contents of the fork mount 200.
Figure 4:
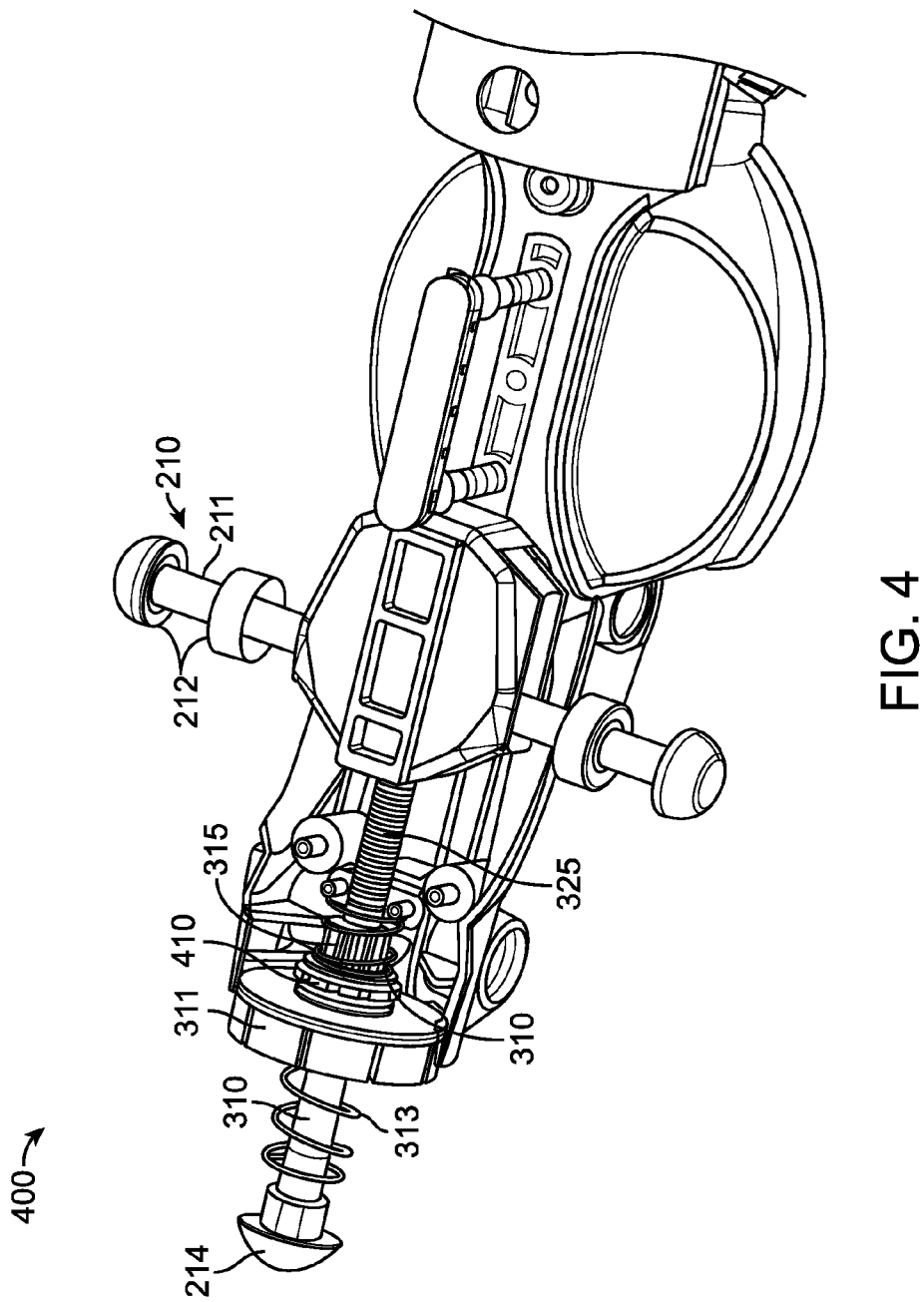
FIG. 4 illustrates a perspective view of the fork mount embodiment illustrated in FIG. 3.

FIG. 3 illustrates an overhead view of one embodiment of the internal contents of the fork mount 200. Shown therein is fork mount 200 with rotatable handle 250, upper housing 220, as well as lower housing 230 removed to allow viewing of the internal contents. Laid cross-ways to the longitudinal direction of the fork mount 200 are the skewers 210, having a shaft 211, and fork prong engagement surfaces 212 on either end of the skewer. Shown at the front end of the fork mount 200 is drive shaft 310, which extends longitudinally through the body of the fork mount 200 and engages skewers 210. The rotation of the handle 250 turns the rotational drive gear 311, which in turn rotates drive shaft 310 passing through its center axis. Rotation of the drive shaft 310 in turn causes prong engagement surfaces 212 to squeeze together, thus closing on prongs of a bicycle fork therein. A key insert 420 allows entry of a key into locking drive axle 600. Also shown is head cone 214 and shaft biasing spring 313. FIG. 4 shows a perspective view of the fork mount 200 embodiment shown in FIG. 3

On the rear side of the rotational drive gear 311 is lock arrangement 400. The lock arrangement 400, while contained in the fork mount 200 for illustrative purposes herein, is not limited to fork mounts, but can be employed with any apparatus having a rotating drive shaft employing a locking mechanism. This is due to the fact that the locking arrangement is a torque reactive mechanism, and thus can be employed in multiple contexts containing such features. The lock arrangement 400 includes a lock-wheel 410 coupled to the drive shaft 310. In particular, the drive shaft 310 includes a drive shaft splined portion 315. The lock-wheel 410 is coupled to the drive shaft splined portion 315 for rotation therewith. Moreover, the locking arrangement 400 includes a lock-wheel biasing spring 415.

Figure 5:
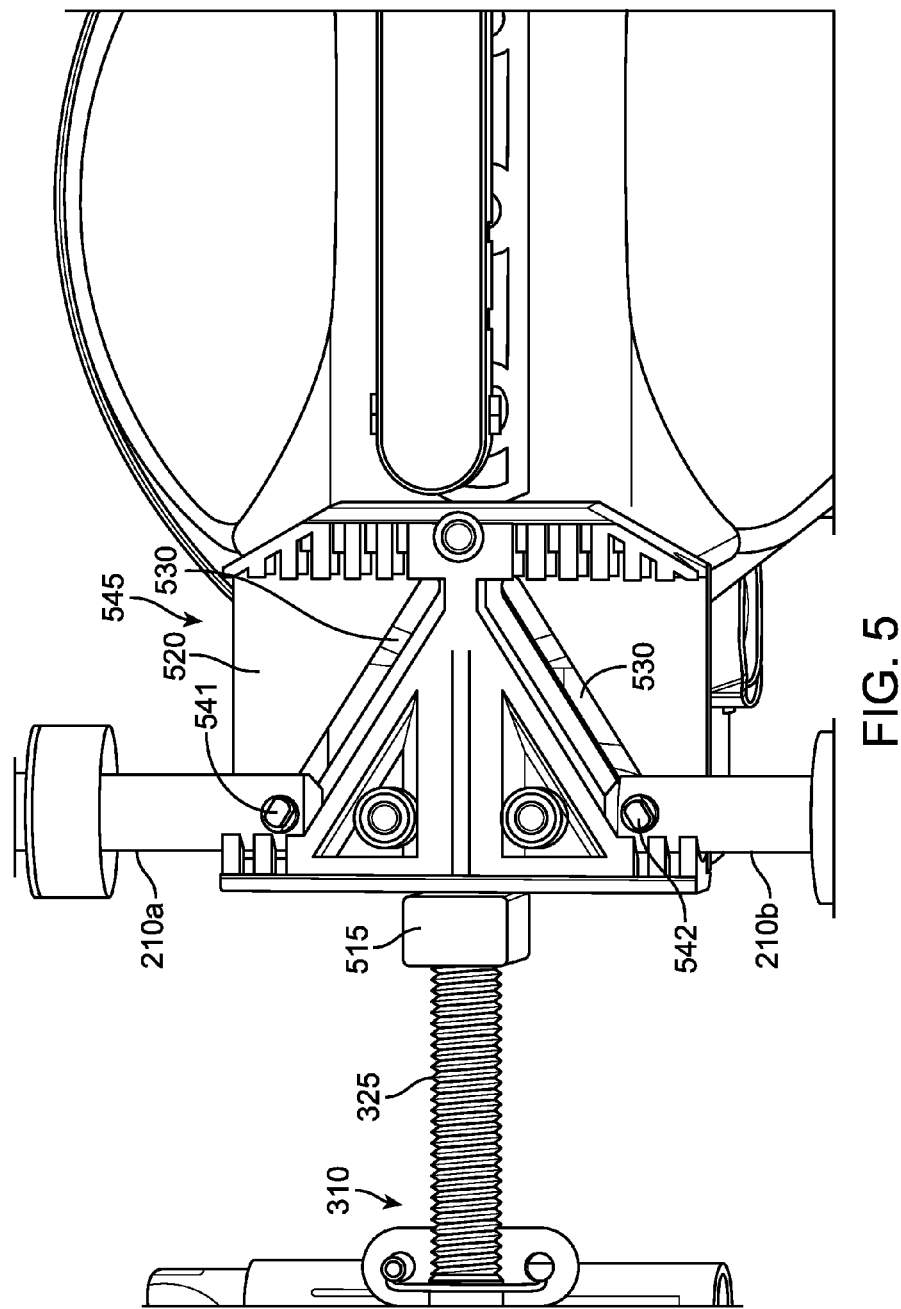
FIG. 5 illustrates one embodiment of the internal contents of a skewer hub.

The lock-wheel biasing spring 415 engages the lock-wheel 410 biasing it toward the rear of the fork mount 200 (i.e. to the right side of FIG. 3). The drive shaft 310 continues from the splined portion 315, with a rear skewer hub engagement portion 325. FIG. 5 is an illustration of one embodiment of the internal contents of the skewer hub 545. The shaft skewer hub engagement portion 325 can be threaded, and is insertable in to the driving block 515. The driving block 515 is coupled to the skewer hub body 520, and thus when the drive shaft 310 is rotated, the driving block 515 and hub body 520 can move along the drive shaft 310 translationally forward or rearward (left and right in FIG. 5). Notably, there are diagonal skewer hub apertures 530 in the skewer hub body 520. Skewers 210a and 210b pass through the diagonal apertures via fasteners 541 and 542. As the drive shaft 310 is rotated, and hub body 520 is translated toward the front of the fork mount 200, due to the diagonal shape of the skewer hub apertures 530; the skewers 210a and 210b will be drawn toward the center of the skewer hub body 520 thus allowing tightening of any fork mount prongs attached to the skewer.

Figure 6:
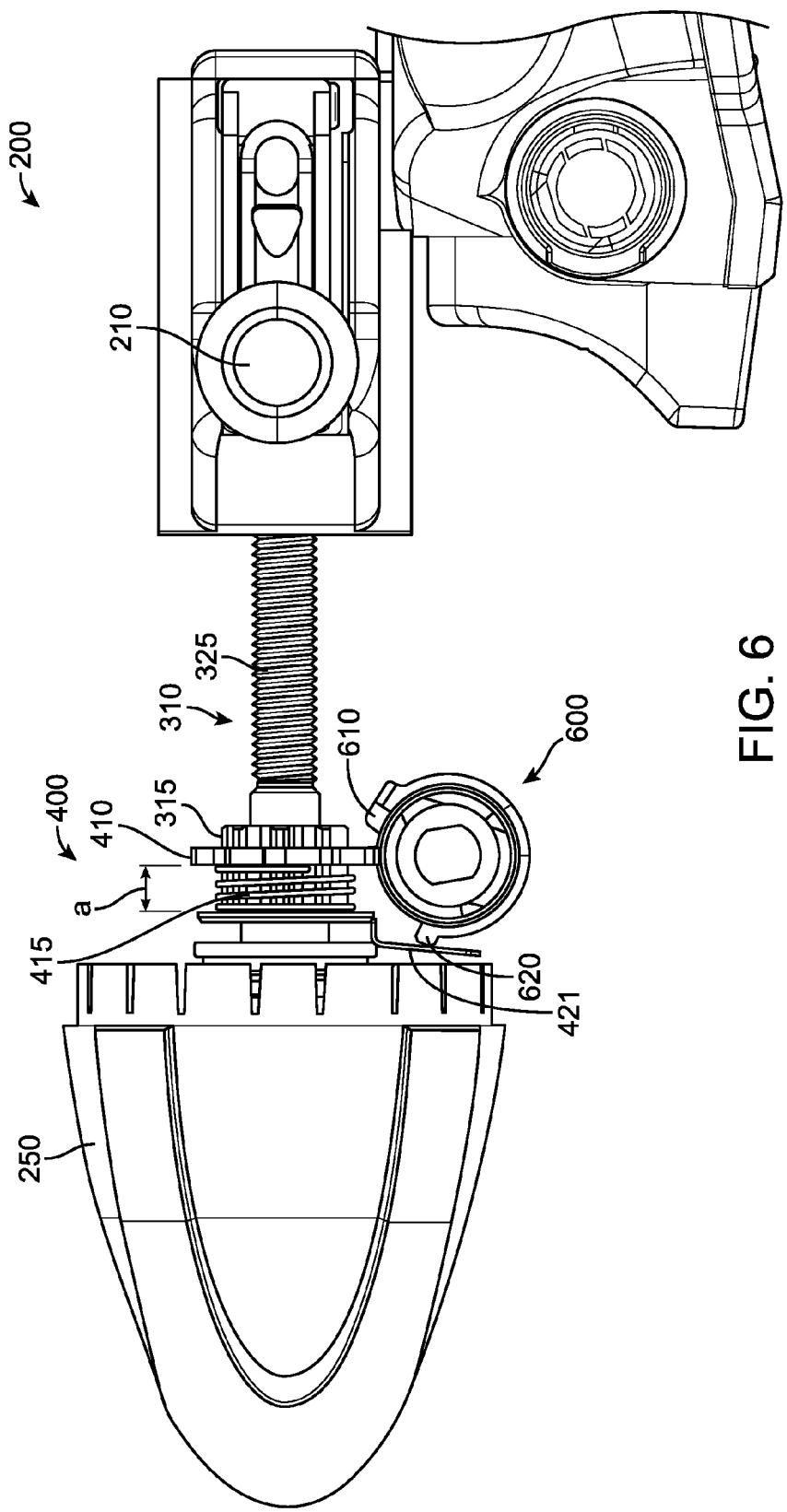
FIG. 6 illustrates a side view of one embodiment of a locking arrangement for a fork mount.
Figure 7:
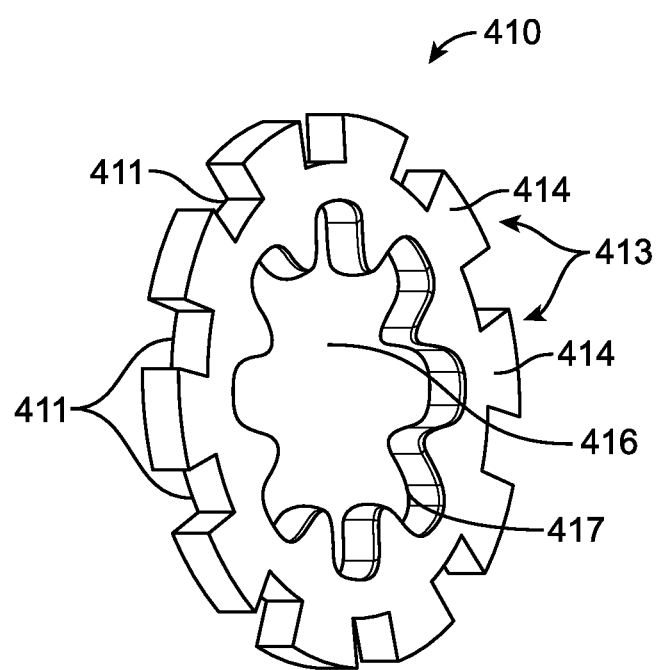
FIG. 7 illustrates one embodiment of a lock-wheel.

FIG. 6 illustrates a side view of one embodiment of a locking arrangement for the fork mount 200. Shown therein is the splined portion 315 and shaft skewer hub engagement portion 325 extending from the rotatable handle 250. The lock-wheel 410 is shown coupled to the drive shaft 310. The lock-wheel 410 is also illustrated in FIG. 7, in which the lock-wheel 410 includes a peripheral zone on its outer circumference having a plurality of detents 411. Each of the plurality of detents 411 is a radial slot recessed into the lock-wheel 410 and open at the outer circumference of the lock-wheel 411. Between each of the plurality of detents 411 are abutment extensions 413 having abutment areas 414. The inner periphery 416 of the lock-wheel 410 includes a splined portion 417. Accordingly, the spline portion 417, and thus the lock-wheel 410, is spline-interconnected to the drive shaft 310, the interconnection being illustrated in FIG. 6. Consequently, when the drive shaft 310 is rotated, the lock-wheel 410 will also rotate.

Figure 8:
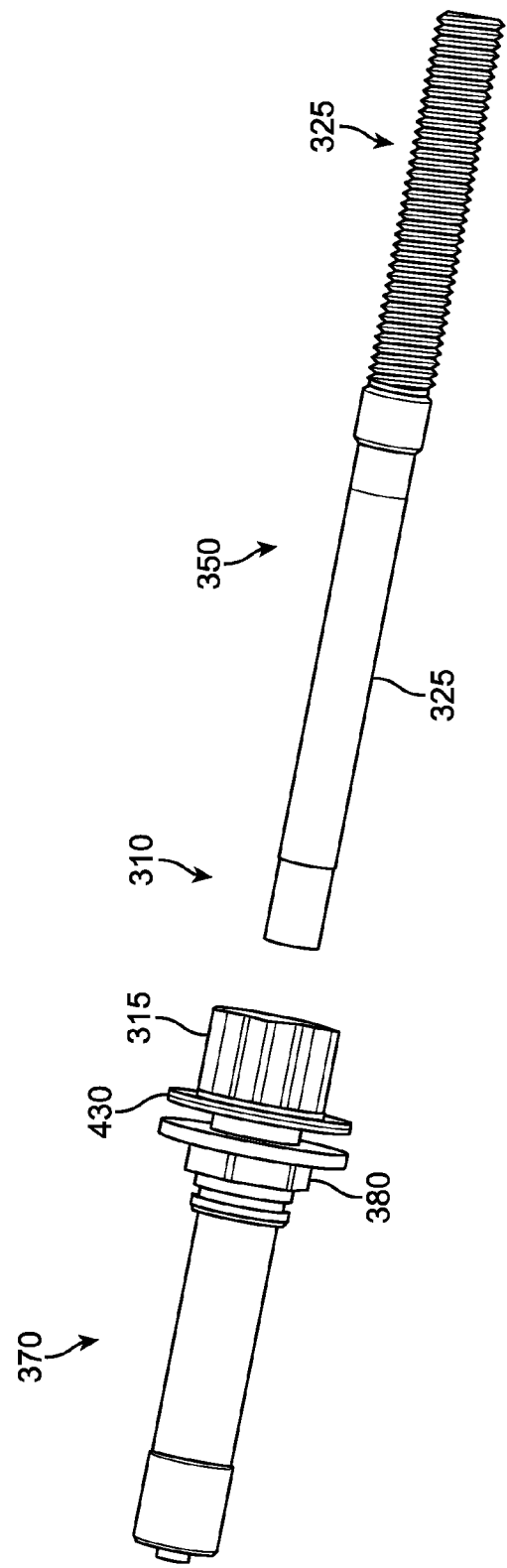
FIG. 8 illustrates one embodiment of a drive shaft.

FIG. 8 illustrates one embodiment of a drive shaft 310. In the illustrated embodiment, the drive shaft 310 is made up of an inner shaft 350, having rear skewer hub engagement portion 325, which is threaded, and an insertable portion 340. The outer shaft 370 has the drive shaft splined portion 315, and the rotational engagement portion 312, and spring abutment 430. The drive engagement portion 380 engages the rotational drive gear 311, thus rotating the drive shaft 310 when torque is applied to the rotatable handle 250.

Figure 9:
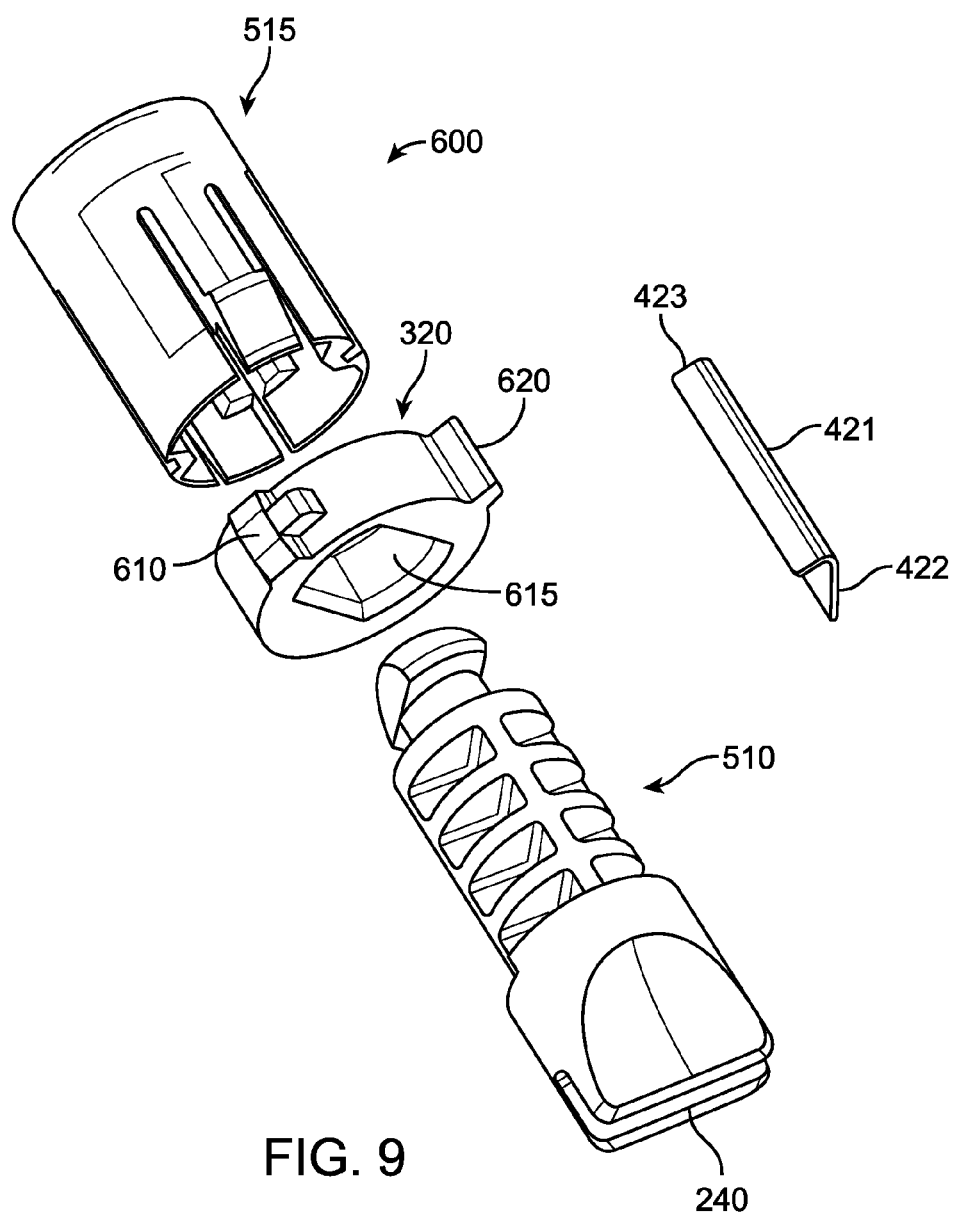
FIG. 9 illustrates one embodiment of a drive shaft.
Figure 10:
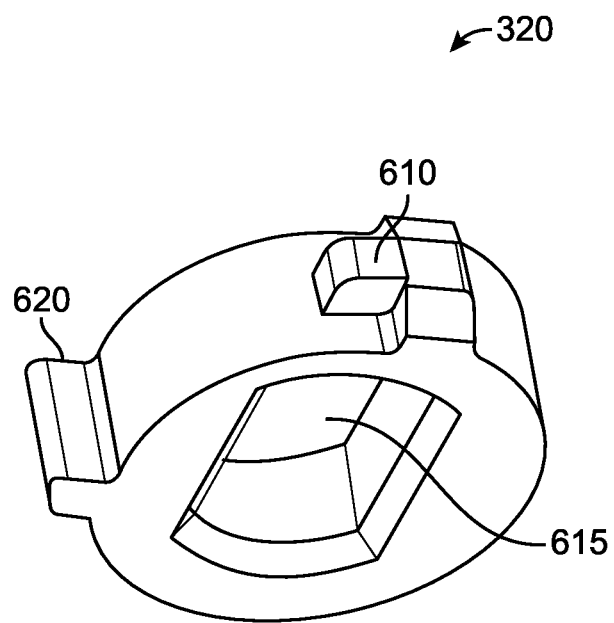
FIG. 10 illustrates one embodiment of a drive axle.

FIG. 9 illustrates the locking drive axle 600, a blocking tab 610, and an interference tab 620. FIG. 9 further illustrates the components of the locking drive axle 600, wherein there is shown the locking barrel 510. The locking drive axle 600 also includes the locking shell 515. The end of the locking barrel 510 fittingly engages the central aperture 615 of the blocking gear 320. Accordingly, when the locking barrel 510 rotates, the blocking gear 320 and locking shell 515 correspondingly rotates, thereby also rotating the blocking tab 610 and interference tab 620. Therefore, in the illustrated embodiment, the locking barrel 510, blocking gear 320 and locking shell 515 make up the drive axle 600, and when rotated correspondingly rotate the blocking tab 610 and interference tab 620 extending from the periphery thereof. The blocking gear 320 is positioned generally in the center of the locking drive axle 600. The blocking gear 320 is itself illustrated in FIG. 10. In the illustrated embodiment, the blocking gear 320 is generally circular, with a central aperture 615, and a blocking tab 610 and an interference tab 620 extending off at different peripheral locations.

The placement of the tab relative the lock-wheel 410 is illustrated in FIG. 6, and is shown just beneath the drive shaft splined portion 315. Moreover, the interference tab 620 is positioned proximate the planar biasing spring 421, which is a spring-biasing member. As shown in FIG. 9, the planar biasing spring 421 includes a planar portion 422 and a lip portion 423 which hangs on an inner surface to maintain the spring 421 in place.

In the embodiment shown in FIG. 6, the blocking tab 610 and locking arrangement 400 is an unlocked configuration wherein the blocking tab 610 is withdrawn from the plurality of detents 411 of the lock-wheel 410. The lock-wheel biasing spring 415 urges the lock-wheel toward the rear of the fork mount 400, a distance a from spring abutment 430. This enables an operator to freely rotate the rotatable handle 250, and thus the drive shaft 310, and lock-wheel 410. In this configuration, the locking barrel 510 is rotated to an unlocked rotation position. Moreover, in this configuration, the interference tab 620 is located proximate or touching the planar biasing spring 421.

In order to lock the lock arrangement 400, an operator would turn the locking barrel 510, thus rotating the blocking gear 320, and correspondingly, the drive axle 600 as a whole. Accordingly, with rotation of the locking barrel 510, the operator can lock the locking arrangement 400. With rotation of the locking barrel 510, the blocking tab 610 is rotated toward the peripheral zone of the lock-wheel 410. With this action, the lock arrangement 400 blocking tab 610 can assume either a lock-actuated configuration (FIG. 11) or a locked configuration (FIG. 12).

During rotation from the unlocked configuration to the lock-actuated or lock configuration, and the blocking tab 610 approaches one of the lock-actuated and locked configurations, the interference tab 620 abuttingly engages the planar biasing spring 421. Thus, while the interference tab 620 in the unlocked position, as shown in FIG. 6, is slightly above engagement of planar biasing spring 421, as it rotates, it engages the spring 421, and as the lock-actuated or locked configurations are reached, the interference tab will be just below engagement with the planar spring 421. As the interference tab 620 abuttingly engages the biasing spring 421, the tab 620 presses into the spring 421, and thus the operator will feel some slight resistance, and then a release as the interference tab 620 rotates past engagement with the planar spring 421. Accordingly, this slight resistance during engagement abruptly moves into a tactile-detectable locked configuration when the blocking tab assumes one of the lock-actuated and locked configurations. Moreover, the interference tab can make a clicking noise during transition, thus producing audible indicia which signal that the lock arrangement has transitioned into one of the lock-actuated and locked configurations.

FIG. 11 illustrates a side view of the lock arrangement 400 in a lock-actuated configuration. In the lock-actuated configuration, the abutment tab is rotated toward the peripheral zone of the lock-wheel 410 to be in abutting engagement with one of the plurality of abutment areas 414. This configuration can occur in the instance where an operator has rotated the rotatable handle 250 such that the blocking tab 610 is aligned with one of the abutment extensions 413 rather than one of the detents 411. Accordingly, when the blocking tab 610 abuttingly engages the abutment areas 414 of abutment extensions 413, the blocking tab 610 will push the lock-wheel 410 in the direction toward the rotatable handle 250. This will compress the lock-wheel biasing spring 415, wherein the lock-wheel 410 can move to a distance b from spring abutment 430, where distance b is shorter than distance a in FIG. 6. Accordingly, the blocking tab 610 is biased toward the abutment areas 414 in the lock-actuated configuration of the lock arrangement. At the same time, however, the abutment extension 413, and accordingly also the abutment area 414, is biased toward the blocking tab in the lock-actuated configuration of the lock arrangement by way of lock-wheel biasing spring 415 and spring abutment 430.

FIG. 12 illustrates a side view of the lock arrangement 400 in a locked configuration. The locked configuration is achieved from either the unlocked configuration or the lock-actuated configuration. For transitioning from the unlocked configuration to the locked configuration, the operator can turn the locking barrel 510, thereby rotating the locking drive axle 600 to a locked position, accordingly moving the blocking tab 610 on the periphery of the blocking gear 320 from a withdrawn position (i.e. unlocked configuration) toward the peripheral zone of the lock-wheel 410 and then received by one of the plurality of detents 411. This occurs in the instance where the blocking tab 610 is aligned with one of the detents 411 rather than one of the abutment extensions 413. When the blocking tab 610 is aligned with one of the plurality of detents 411, the blocking tab 610, upon rotation, is received by one of the plurality of detents 411, and thus prevents rotation of the lock-wheel 410.

When transitioning from the lock-actuated configuration to the locked configuration, blocking tab 610 is originally in abutting engagement with the abutment areas 414 of abutment extensions 413. Additionally, the lock-wheel 410 has been pushed in the direction toward the rotatable handle 250 to compress the lock-wheel biasing spring 414. If the operator attempts to rotate the handle 250, this will cause rotation of the drive shaft 310 and accordingly rotation of the lock-wheel 410. As the lock-wheel 410 rotates, the abutment extensions 413 will be rotatably moved away from alignment with the blocking tab 610. Correspondingly, at least one of the plurality of detents 411 is rotated to align with the blocking tab 610. Accordingly, when this occurs the lock-wheel 410, due to the lock-wheel biasing spring 415, will be urged rearward away from the rotatable handle 250 causing at least one of the plurality of detents 411 to receive the blocking tab 610, and lock-wheel 410 to expand outward to a distance c from spring abutment 430, where distance c is longer than distance b in FIG. 6. This will have the effect of preventing rotation of the lock-wheel 410. With the lock-wheel 410 prevented from rotation, the rotatable handle 250 correspondingly be prevented from rotation, and an operator will be unable to loosen the skewers 210. In some embodiments, distances a (FIG. 6) and c (FIG. 12) have the same or different length from spring abutment 430, but in either case both are longer than distance b (FIG. 11), where lock-wheel 410 is compressed by blocking tab 610.

Accordingly, the transition from a lock-actuated configuration to a locked configuration occurs by rotation of the rotatable handle 250. However, the degree of rotation during this rotation would be minute, and therefore negligible degree of loosening of the skewers could occur. Further, in some embodiments, the rotation is of such a small degree that an operator would not notice a rotational difference in the rotatable handle 250 in the lock-actuated and locked configurations. The degree of rotation during this transition is determined largely by the number of the plurality of detents 411 and abutment extensions 413, and the degree therebetween. The closer each of the plurality of detents are to one another around the periphery of the lock-wheel, the smaller the degree of rotation by the handle 250 for transitioning from the lock-actuated to the locked configuration. In some embodiments, the rotatable handle 250 rotates up to 2 degrees, alternatively, up to 4 degrees, alternatively up to 6 degrees, alternatively up to 8 degrees, alternatively up to 10 degrees, alternatively up to 20 degrees in the lock-actuated configuration before lock-wheel 410 snaps into place to achieve the locked configuration.

Due to the resistance of the interference tab 620 engagement with the planar biasing spring 421, an operator would be unaware of whether the lock arrangement is transitioning to a lock-actuated or locked configuration. In either case, the tactile indicia will feel the same to the operator as the locking barrel is rotated, and also an audible click signals the locking transition. Accordingly, the lock arrangement disclosed herein permits a user to lock the fork mount whether a detent 411 is aligned with the blocking tab 610 or not. If not aligned, the locking arrangement is maintained in the lock-actuated configuration whereupon any rotation of the handle causes the blocking tab to 610 to bias into and be received by one of the detents 411. Moreover, the locking arrangement is not limited to fork mounts, but can be employed with any torque reactive tightening mechanism, that can include a rotatable drive shaft 310.

The various embodiments described above are provided by way of illustration only and should not be construed to limit the scope of the disclosure. Various modifications and changes can be made to the principles and embodiments described herein without departing from the scope of the disclosure and without departing from the claims which follow.

What is claimed is:

1. A lock arrangement (400) for a drive shaft (310) of a tightening mechanism in a sports carrier, the lock arrangement (400) comprising:
    a lock-wheel (410) coupled to the drive shaft (310) for rotation therewith;
    the lock-wheel (410) having a peripheral zone comprising a detent (411) and an abutment area (414) adjacent thereto;
    a blocking tab (610) rotatably movable toward the peripheral zone of the lock-wheel (410) and insertable into the detent (411); and
    the blocking tab (610) being in abutting engagement with the abutment area (414) and the lock-wheel (410) being biased toward a front distal end of the drive shaft (310) in a lock-actuated configuration of the lock arrangement (400), the blocking tab (610) being received in the detent (411) in a locked configuration of the lock arrangement (400) and the blocking tab (610) being withdrawn from the detent (411) in an unlocked configuration of the lock arrangement (400).

2. The lock arrangement (400) of claim 1, wherein the peripheral zone of the lock-wheel (410) is circumferential and comprises a plurality of detents (411) and at least one abutment area (414).

3. The lock arrangement (400) of claim 1, wherein the peripheral zone of the lock-wheel (410) is circumferential and comprises a plurality of alternating detents (411) and abutment areas (414).

4. The lock arrangement (400) of claim 3, wherein each of the plurality of detents (411) is a radial slot recessed into the lock-wheel (410) and open at the circumference of the lock-wheel (410).

5. The lock arrangement (400) of claim 1, wherein an inner periphery (416) of the lock-wheel (410) is spline-interconnected to the drive shaft (310) for rotation therewith.

6. The lock arrangement (400) of claim 1, wherein the blocking tab (610) is biased toward the abutment area (414) in the lock-actuated configuration of the lock arrangement (400).

7. The lock arrangement (400) of claim 1, wherein the abutment area (414) is biased toward the blocking tab (610) in the lock-actuated configuration of the lock arrangement (400).

8. The lock arrangement (400) of claim 7, wherein the blocking tab (610) inserts into the detent (411) when the lock-wheel (410) is rotated while the blocking tab (610) is in the lock-actuated configuration of the lock arrangement (400) thereby transitioning the lock arrangement (400) from the lock-actuated configuration to the locked configuration.

9. The lock arrangement (400) of claim 1, further comprising:
    a biasing spring (415) in abutting engagement with the lock-wheel (410) that biases the abutment area (414) toward the blocking tab (610) in the lock-actuated configuration of the lock arrangement (400).

10. The lock arrangement (400) of claim 1, further comprising:
    a tactile indicia (421) that signals that the lock arrangement (400) has transitioned into one of the lock-actuated and locked configurations.

11. The lock arrangement (400) of claim 10, further comprising:
    the blocking tab (610) extending off of a drive axle (600) at a periphery thereof and an interference tab 620 extending off of the drive axle (600) at a different peripheral location; and
    wherein the interference tab 620 abuttingly engages a spring-biased member (421) as the blocking tab (610) approaches one of the lock-actuated and locked configurations.

12. The lock arrangement (400) of claim 11, wherein the interference tab 620 abruptly moves into a tactile-detectable locked position when the blocking tab (610) assumes one of the lock-actuated and locked configurations.

13. The lock arrangement (400) of claim 1, further comprising:
    an audible indicia that signals that the lock arrangement (400) has transitioned into one of the lock-actuated and locked configurations.

14. The lock arrangement (400) of claim 13, further comprising:
    the blocking tab (610) extending off of a drive axle (600) at a periphery thereof and an interference tab 620 extending off of the drive axle (600) at a different peripheral location; and
    wherein the interference tab 620 abuttingly engages a spring-biased member (421) as the blocking tab (610) approaches one of the lock-actuated and locked configurations and the interference tab 620 abruptly moves into a audibly-detectable locked position when the blocking tab (610) assumes one of the lock-actuated and locked configurations.

\* \* \* \* \*